May 4, 1965 T. R. LINGLEY 3,181,755
CARRIER FOR ATTACHMENT TO A MOTOR VEHICLE
Filed Aug. 13, 1963 3 Sheets-Sheet 1
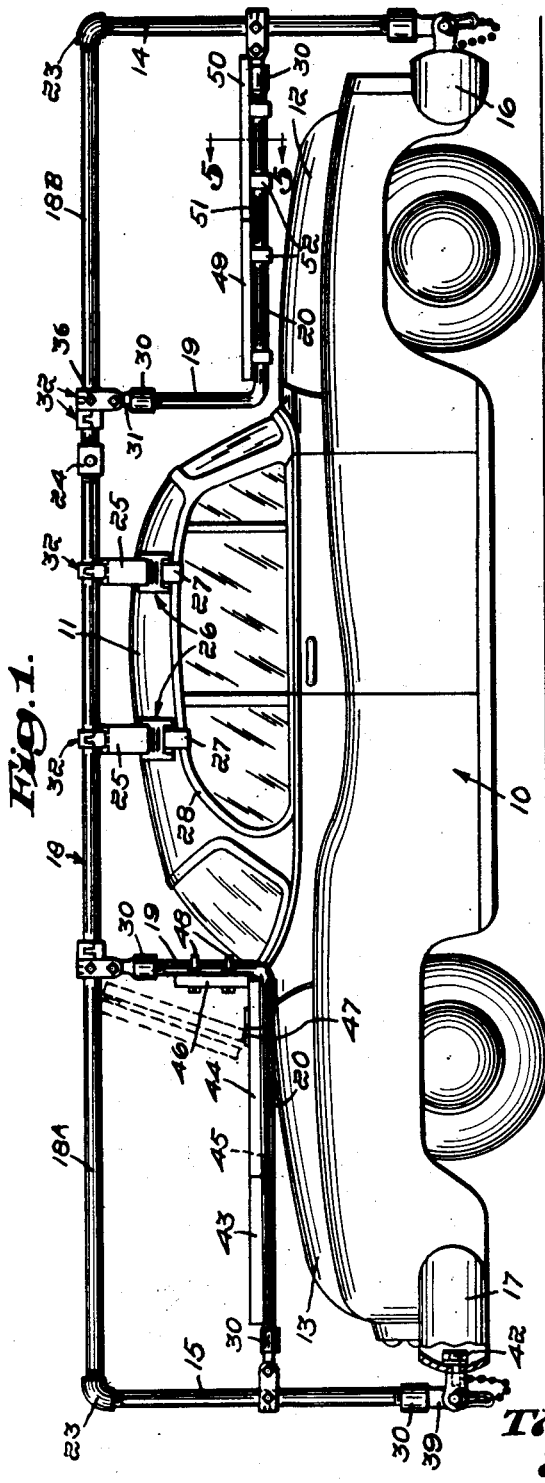
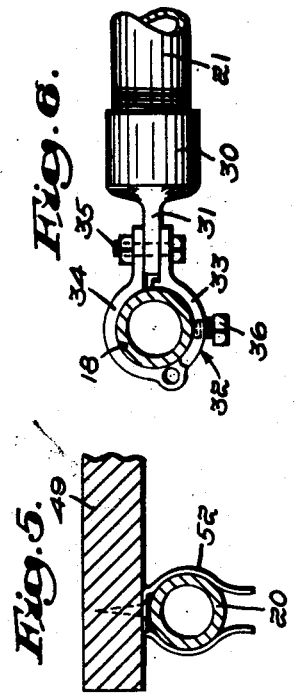
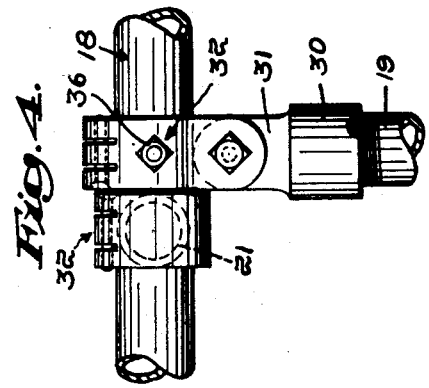
Inventor:
Theodore R. Lingley,
by
Attorney

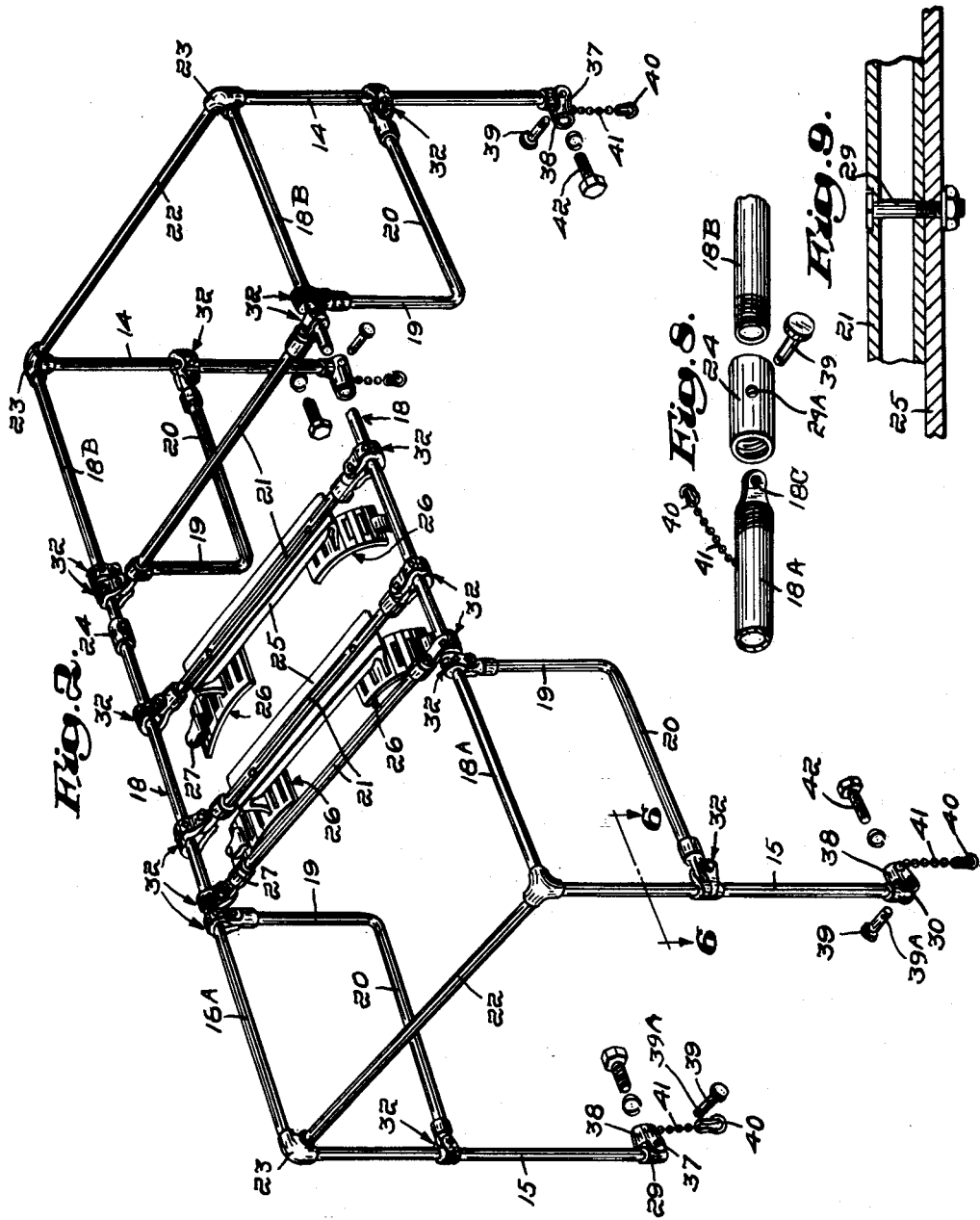

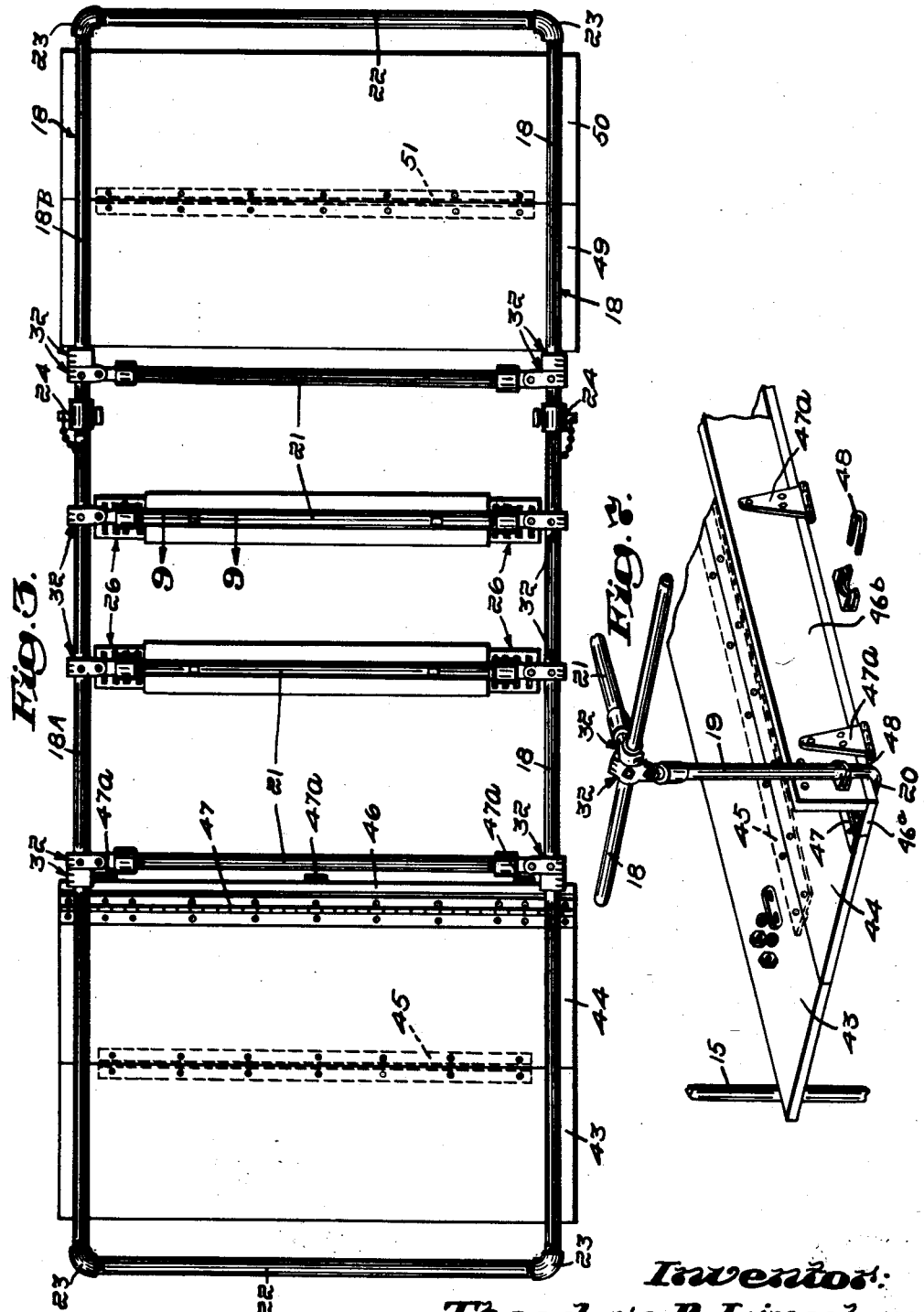

United States Patent Office 3,181,755
Patented May 4, 1965

3,181,755
CARRIER FOR ATTACHMENT TO A
MOTOR VEHICLE
Theodore R. Lingley, 17 Warren Lane, Weston, Mass.
Filed Aug. 13, 1963, Ser. No. 303,467
7 Claims. (Cl. 224—42.03)

The present invention relates to carriers for attachment to motor vehicles and particularly to such carriers of the type to be supported by the roof and at least one of the bumpers thereof or by both bumpers, and is a continuation-in-part of my co-pending application Serial No. 91,477, filed February 24, 1961, now abandoned.

The usual passenger automobile by itself, falls far short of meeting present day transportation requirements for there is insufficient room inside for large objects of which boats, skiis, and extra luggage are common examples. The most common type of carrier is supported wholly by the roof and usually consists of two cross members that are spaced fairly close together. With some long objects, boats for example, it is necessary to lash the ends of the carrier supported object to the ends of the vehicle. This type of carrier does not provide adequate safeguards against accidents since it is not positively secured to the vehicle and the lashings cannot always be made sufficiently taut to prevent movement of the load.

Various proposals have been made to provide roof supported carriers that were attachable to the rear bumpers to provide a basis for better weight distribution and to enable larger and longer loads to be safely carried. The general objective of the present invention is to provide such carriers that combine simplicity, economy and strength of construction, ease of installation, safety, and versatility.

In accordance with the invention, a carrier has a pair of side sections each including an upright member for at least one of its ends, a horizontal member joined to the upper end thereof, and a brace member for each upright member. Each brace member includes two arms disposed at right angles to each other, one locked to an upright member and one locked to the horizontal member connected thereto. Each upright member has means enabling it to be detachably connected to a bumper of the vehicle and the sections are interconnected by transverse members at least one of which is preferably resting on and locked to a cross member of a roof-supported carrier. The brace members are arranged and dispsed for load suporting functions with, for example, platforms being transversely supported by the horizontal brace arms and, in some cases, hinged to the vertical brace arms.

In the accompanying drawings, there is shown illustrative embodiments of the invention from which these and other objects, novel features, and the advantages of the invention will be readily apparent.

In the drawings:

FIGURE 1 is a side elevation of a motor vehicle equipped with a carrier in accordance with the invention attached to both bumpers, FIGURE 2 is a perspective view of the carrier removed from the vehicle, FIGURE 3 is a top plan view of the carrier, FIGURE 4 is a fragmentary view, on an increased scale of the zone wherein a vertical brace arm and a transverse member are joined to the horizontal member of a carrier section, FIGURE 5 is a fragmentary section, also on the scale of FIGURE 4, taken approximately along the indicated lines 5—5 of FIGURE 1, FIGURE 6 is a fragmentary section taken approximately along the indicated lines of FIGURE 2, FIGURE 7 is a fragmentary, perspective view of a platform carried by the corresponding rear braces of a carrier, FIGURE 8 is an exploded, fragmentary view of one of the horizontal members, and FIGURE 9 is a fragmentary and enlarged section of a transverse member showing its attachment to a roof-supported carrier.

In FIGURE 1, a conventional motor vehicle of the passenger type, is generally indicated at 10 and, as is typical, its roof 11 extends a considerable distance above the hood 12 of its engine compartment and the cover 13 of its trunk.

In accordance with the invention, each carrier consists of a pair of side sections having front and rear upright members 14 and 15, when the carrier is to be attached to the front and rear vehicle bumpers 16 and 17, respectively, interconnected at their upper ends by a horizontal member 18. The sections have a brace between each upright and the horizontal member connected thereto and each such brace includes arms 19 and 20 interconnected at right angles with each arm 19 attached to the appropriate upright member. The sections are interconnected by intermediate transverse members 21 and end transverse members 22.

One of the advantages of a carrier in accordance with the invention is that it may be formed from tubular stock which is readily available, strong, and reasonably priced. Such stock may be cut to length and threaded and the uprights 14, 15, horizontal members 18, and end transverse members 22 are shown as threaded into appropriate ends of fittings 23 of a side opening elbow, readily available type. When it is not desired to have the carrier capable of being disassembled, the various parts, or at least some of them, may be welded together.

The horizontal members 18 may be advantageously be made in sections 18A and 18B with a preferred arrangement utilizing sleeve type threaded couplings 24 rearwardly of but close to the forward braces. This connection enables the front part of the carrier to be removed. The carrier is then supported by the cross members 25 of a carrier of the type that is attached to the roof 11. Such a roof supported carrier is indicated generally at 26 and conventionally includes hooks 27 caught on the gutters 28. As may be seen in FIGURE 8, each section 18A includes an eye 18C dimensioned to fit within the sleeve 24 and the proximate end of a section 18B. By this arrangement, when the front part of the carrier is removed, eyes 18C enable anchoring cables, ropes or chains to be attached thereto and to the vehicle, usually to its front bumper 16. It is preferred that the carrier, at least when used without a front part, be positively connected to the cross members 25 of a carrier 26 as by bolts 29 as shown in FIGURE 9.

In practice, the connections between the brace arms 19, 20 and the uprights 14, 15 and horizontal members 18 and between the horizontal members 18 and the intermediate transverse member 21 are all of the type whose details may best be seen in FIGURE 3. Each arm 19, 20 or transverse member 21 is threaded or welded into a cap 30 terminating in a blade 31, see FIGURE 6. The clamps generally indicated at 32, as may best be seen in FIGURES 4 and 6, comprise hingedly connected sections 33 and 34 and have their free ends joined together through the blade 31 by a bolt 35. Each clamp section 34 has a clamp anchoring set screw 36.

The upright members 14, 15 have their lower ends threaded or welded into similar caps 30 whose blades 31 are each locked between the ears 37 of a socket 38 by a hardened steel pin 39 of the clevis type having a transverse bore 40 therein for a hook 39A whose chain 41 is anchored to the interiorly threaded socket 38. A cap screw 42 extends through an appropriate one of the car bumpers and is threaded into a socket 38. By this arrangement, detachability is provided with positive safeguards against parts becoming accidentally separated. It is preferred that the connections between the sections of the horizontal members be similarly positively locked with hardened steel pins 39 of the clevis type extending through the transverse sleeve bores 24A and through the enclosed eye 18C.

A carrier in accordance with the invention is easily assembled and may be quickly and easily attached or removed and has adequate strength to support large and heavy loads. While the nature of the loads may and does vary widely, the bracing of the carrier sections affords extra supporting structure. The rear bracing is shown as having platform sections 43 and 44 joined together by hinges 45 with the section 44 connected to a cross piece 46 by hinges 47. The cross piece 46 is clamped to the upright brace arms 19 by yokes 48 and is dimensioned so that vision through the rear window is not obstructed. The sections 43 and 44 are dimensioned to be supported by the brace arms 20 and to enable them to be folded together as indicated in dotted lines in FIGURE 1 to permit access to the trunk and to permit its cover to be raised. It is preferred that the cross piece 46 be itself formed from sections 46$^a$ and 46$^b$ joined together so that they may be disposed at right angles as shown, when in use, and be capable of being laid flat when detached.

The front bracing is shown as supporting a somewhat different platform consisting of sections 49 and 50 hinged together as at 51 and provided with depending spring clips 52 for detachable connection with the horizontal brace arms 20, thus to permit access to the engine.

From the foregoing, it will be apparent that carriers in accordance with the invention are well adapted to meet requirements as to strength, safety, and versatility.

I claim:

1. A carrier for attachment to a motor vehicle having at least one bumper provided with a pair of carrier supports, said vehicle also having supporting structure on its roof, said carrier including a pair of side sections each including a upright end member attachable to a support, a horizontal member joined to the upper end thereof and of sufficient length to extend beyond said supporting structure when said upright is attached to a support, and a brace including two angularly disposed arm members, one arm member locked to said upright member between the ends thereof and the other locked to the horizontal member between its junction with said upright member and the zone of the supporting structure when the carrier is attached to the vehicle, transverse members interconnecting the horizontal members of the sections, at least one of said transverse members being engageable with said supporting structure and being slidable relative to said horizontal members, and means to lock said slidable transverse member to said horizontal members.

2. A carrier for attachment to a motor vehicle having at least one bumper provided with a pair of carrier supports, said vehicle also having supporting structure on its roof, said carrier including a pair of side sections each including an upright end member attachable to a support, a horizontal member joined to the upper end thereof and of sufficient length to extend beyond said supporting structure when said upright is attached to a support, and a brace including two angularly disposed arm members, one arm member locked to said upright member between the ends thereof and the other locked to the horizontal member between its junction with the upright member and the zone of the supporting structure when the carrier is attached to the vehicle, and detachable transverse connections between said sections, said connections being between said horizontal members, said connections including end clamps slidably and releasably encircling said horizontal members and provided with means adjustable into and out of holding engagement therewith, at least one connection being a transverse member engageable with said supporting structure.

3. A carrier for attachment to a motor vehicle having at least one bumper provided with a pair of carrier supports, said vehicle also having supporting structure on its roof, said carrier including a pair of side sections each including an upright end member attachable to a support, a horizontal member joined to the upper end thereof and of sufficient length to extend beyond said supporting structure when said upright is attached to a support and a brace including two angularly disposed arm members, one arm member locked to said upright member between the ends thereof and the other locked to the horizontal member between its junction with the upright member and the zone of the supporting structure when the carrier is attached to the vehicle, transverse members, and transversely alined sockets for each transverse member, each carried by a respective one of the horizontal members, each transverse member including end portions threaded in said sockets, at least one of said transverse members being engageable with said supporting structure.

4. A carrier for attachment to a motor vehicle having at least one bumper provided with a pair of carrier supports, said vehicle also having supporting structure on its roof, said carrier including a pair of side sections each including an upright end member attachable to a support, a horizontal member joined to the upper end thereof and of sufficient length to extend beyond said supporting structure when said upright is attached to a support, and a brace including two angularly disposed arm members, one arm member locked to said upright member between the ends thereof and the other locked to the horizontal member between its junction with the upright member and the zone of the supporting structure when the carrier is attached to the vehicle, transverse members, and transversely alined sockets for each transverse member, each carried by a respective one of the horizontal members, each transverse member including end portions threaded in said sockets, at least one of said transverse members being engageable with said supporting structure, the sockets for the last named transverse member being slidable relative to said horizontal members, and means to lock said slidable sockets thereto.

5. A carrier for attachment to a motor vehicle having at least one bumper provided with a pair of carrier supports, said vehicle also having supporting structure on its roof, said carrier including a pair of side sections each including an upright end member attachable to a support, a horizontal member, an elbow member into which said upright and horizontal members are threaded, said horizontal members being of sufficient length to extend beyond said supporting structure when said upright is attached to a support, and a brace including two angularly disposed arm members, one arm member detachably locked to said upright member between the ends thereof and the other detachably locked to the horizontal member between said elbow and the zone of the supporting structure when the carrier is attached to the vehicle, and detachable transverse connections between said horizontal members, one connection being a transverse member threaded into said elbows and another connection being a transverse member engageable with said supporting structure.

6. A carrier for attachment to a motor vehicle having at least one bumper provided with a pair of carrier supports of the type having a socket opening in a fore and aft direction and intersected by a transverse bore, said vehicle also having supporting structure on its roof, said carrier including a pair of side sections each including an upright end member, the lower end of each upright including a portion entrant of said socket, a pin between the lower end portion of said member and said support, a lock for said pin, a horizontal member joined to the upper end of said upright member and of sufficient length to extend beyond said supporting structure when said upright is attached to a support, and a brace including two angularly disposed arm members, one arm member locked to said upright member between the ends thereof and the other locked to the horizontal member between its junction with said upright member and the zone of the supporting structure when the carrier is attached to the vehicle, transverse members interconnecting the horizontal members, at least one of said transverse members being engageable with said supporting structure.

7. A carrier for attachment to a motor vehicle having its bumpers each provided with a pair of carrier supports, said vehicle also having supporting structure on its roof, said carrier including a pair of side sections each including upright end members attachable to corresponding supports of the bumpers, a horizontal member joined to upper ends of the upright members, and braces for each section, each brace including two angularly disposed arm members, one arm member locked and an upright member between the ends thereof and the other locked to the horizontal member between its junction with that upright member and the zone of the supporting structure when the carrier is attached to the vehicle, transverse members interconnecting the horizontal members adjacent that junction with the upright members, a transverse member interconnecting the horizontal members and engageable with said supporting structure, each horizontal member including first and second portions, and a sleeve joining said portions between said zone and the second named arm of one of said braces, the first portion of each horizontal member including an eye within the appropriate sleeve, and a locking pin extending transversely through each sleeve and the contained eye.

References Cited by the Examiner
UNITED STATES PATENTS

| | | | |
|---|---|---|---|
| 1,701,985 | 2/29 | Ponto | 287—117 |
| 2,537,587 | 1/51 | Humphrey | 224—42.03 |
| 2,617,572 | 11/52 | Knight | 224—42.03 |

HUGO O. SCHULZ, *Primary Examiner.*